(12) United States Patent
Koegler

(10) Patent No.: US 8,613,568 B2
(45) Date of Patent: *Dec. 24, 2013

(54) METHOD AND DEVICE FOR LAYING PIPELINES IN THE GROUND

(71) Applicant: Herrenknecht AG, Schwanau (DE)

(72) Inventor: Ruediger Koegler, Nordgeorgsfehn (DE)

(73) Assignee: Herrenknecht AG, Schwanau (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/659,480

(22) Filed: Oct. 24, 2012

(65) Prior Publication Data
US 2013/0051922 A1  Feb. 28, 2013

Related U.S. Application Data

(63) Continuation of application No. 12/448,685, filed as application No. PCT/EP2007/011298 on Dec. 20, 2007, now Pat. No. 8,568,059.

(30) Foreign Application Priority Data

Dec. 29, 2006  (DE) .......................... 10 2006 062 098

(51) Int. Cl.
*F16L 1/028*  (2006.01)

(52) U.S. Cl.
USPC ............................ 405/174; 405/180; 405/184

(58) Field of Classification Search
USPC .................. 405/174, 180, 181, 182, 183, 184
See application file for complete search history.

(56) References Cited

U.S. PATENT DOCUMENTS

| | | | | |
|---|---|---|---|---|
| 3,589,135 A | * | 6/1971 | Ede | 405/184 |
| 3,789,614 A | * | 2/1974 | Rogers | 405/182 |
| 3,859,809 A | * | 1/1975 | Clayhold et al. | 405/179 |
| 4,014,175 A | * | 3/1977 | Brink | 405/183 |
| 4,448,567 A | * | 5/1984 | Tsuda | 405/184 |
| 4,896,997 A | * | 1/1990 | Gaylin | 405/174 |
| 6,183,163 B1 | * | 2/2001 | Nikiforov et al. | 405/184 |
| 2002/0066214 A1 | * | 6/2002 | Miyazaki | 405/180 |

FOREIGN PATENT DOCUMENTS

WO   WO 9312366 A1 * 6/1993 ............... E02F 5/10

* cited by examiner

*Primary Examiner* — Frederick L Lagman
(74) *Attorney, Agent, or Firm* — Mark Rogers

(57) ABSTRACT

In the case of a method for laying pipelines in the ground, a drill-hole is produced along a laying line, from a starting pit to a target pit, by a drilling head at the start of a pipeline, the drilling head being connected to a laying vehicle on the ground surface via a narrow vertical connecting device. The soil dislodged by the drilling head is removed from the drill-hole and conveyed to the surface. The force required for the drilling and laying operation is applied by the laying vehicle and/or by a feed device in the starting pit.

12 Claims, 5 Drawing Sheets

METHOD AND DEVICE FOR LAYING PIPELINES IN THE GROUND

Figure 1A:
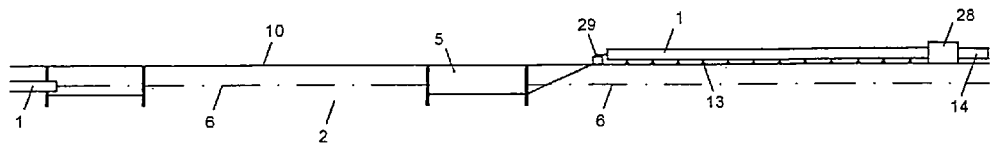

This application is a Continuation of U.S. application Ser. No. 12/448,685, filed Jun. 29, 2009, which in turn claims priority to PCT Application PCT/EP2007/011298 filed Dec. 20, 2007, which in turn claims priority to German Application 10 2006 062 098.4, filed Dec. 29, 2006

The present invention relates to a method, and to a device that can be used therewith, for laying pipelines in the ground.

PRIOR ART

The laying of pipelines in the ground has remained practically unchanged for decades. Normally, the topsoil is first stripped away and placed to the side, the pipes to be laid are then let down, in single lengths of approximately 12-16 m, into the route, where they are welded to one another and the joints are covered to protect against corrosion. Then—if necessary—the ground-water is lowered, and the pipe trench is then excavated. In the next working step, the welded pipe runs are lifted by so-termed sidebooms or draglines, and lowered into the pipe trenches. Frequently, in addition to the product pipe (e.g. for transport of oil or gas), a so-termed cable protecting sheath is laid in the same pipe trench, into which sheath control and signal cable, for monitoring the pipeline, is subsequently drawn. In a further working step, the ground-water level is restored, after which the pipe trench can be filled-in. Finally, the topsoil is replaced and the route is recultivated.

The working procedure described is time-intensive and cost-intensive, and involves, in addition to major interventions in the natural environment (destruction of the soil structure, ground-water lowering, emissions resulting from intensive use of machines), substantial hazards for the workers employed there (overhung loads, working in pipe trenches, etc.).

In the case of smaller pipelines (diameter <400 mm), the machinery resource requirement can normally be limited to smaller construction machines (wheeled or tracked excavators, welding equipment on car trailers, etc.). Also becoming increasingly common for these smaller pipeline diameters is "half-open" laying, whereby the pipeline is put into the ground by means of special plows. For this method, which is advantageous from an ecological point of view, there are nevertheless limitations in respect of the maximum outer diameter (at present <400 mm) and the pipe material (suitable materials are, for example, PE and cast iron, but steel pipes cannot be used, or can be used only to a limited extent, since they permit only larger elastic radii of curvature).

The laying of large (steel) pipelines (diameter >400 m) necessitates the intensive use of large earth-moving machines (excavator, tracked vehicle, wheeled loader), mobile welding stations (welding tractors, welding Unimogs, etc.), and heavy equipment for moving the single pipes, or the welded pipe runs (lorries, sidebooms, draglines). Associated therewith are corresponding effects upon the environment, which, particularly at present, can increasingly lead to major problems even during the approval phase of pipeline projects and, furthermore, often result in a low level of acceptance amongst the affected nearby residents or landowners (e.g. farmers).

Apart from the described construction methods of laying in open pipe trenches or employing a half-open laying method, nowadays trenchless laying methods, such as horizontal drilling or pipe thrusting, are also frequently used in route segments of particular ecological sensitivity. These methods, however, are usually substantially more time-intensive and cost-intensive than the conventional laying methods, such that the use of these techniques remains limited to quite particular route segments. Moreover, there are also special technical restrictions on these construction methods, for example in respect of the subsoil or the drilling length.

TECHNICAL OBJECT

The present invention is therefore based on the object of developing a laying method, and devices required for same, the use of which enables large (>400 mm) pipelines (including those made of steel) to be laid with little impairment of the environment and with a high degree of working safety for the personnel employed, with, at the same time, high laying capacity (advantage in respect of time and cost).

ACHIEVEMENT OF THE TECHNICAL OBJECT

This object is achieved by a method having the features of claim 1. Claim 21 relates to a laying vehicle that can be used with the method. Advantageous developments of the invention are given by the dependent claims.

In the case of the method, a drilling head present in the ground is connected, by a laying vehicle present on the ground surface, via a vertical connecting device, to the required control and supply lines. As soon as the laying vehicle moves in the direction of the route, the vertical connecting device—the structure of which, in soft ground, corresponds approximately to that of the cable plows and, in rocky ground, additionally includes a chain cutter, as, for example, in the case of trench cutting—produces only a narrow slit, of approximately 100-200 mm in width. At the same time, the drilling head produces a drill-hole, the soil that is to be worked is dislodged, and is conveyed to the surface (preferably also through the vertical connecting device). The diameter of the drilling head is slightly greater than that of the pipeline to be laid, and in this case can have a diameter of up to 1,500 mm and more.

For the purpose of overcoming the forces (e.g. pressure forces for drilling head, frictional forces on the pipeline, etc.) that occur during the drilling and laying operation, the laying vehicle—in combination with other traction vehicles, if necessary—and/or a feed device is/are employed in the starting pit. The latter device is preferably a machine, also known as a pipe thruster, which, through friction, can transmit feed forces to a pipeline from the outside, without thereby destroying the covering of the pipeline.

The exact control of the drilling head, and consequently the final position of the pipeline in the ground, can be effected in a plurality of ways. On the one hand, the vertical connecting device can be connected to the laying vehicle via corresponding devices (similar to the scarifiers on tracked vehicles or to the arms of excavators), such that controlled control pulses can be transmitted directly to the drilling head via the vertical connecting device, as a result of which the position of the drilling head in the ground can be changed three-dimensionally. On the other hand, in a preferred embodiment variant, control cylinders, which can directly change the direction of the drilling head—in a manner analogous to the control of pipe thrusting machines—can be mounted in the drilling head.

The exact position of the laying vehicle can be effected either by means of GPS or, alternatively, also by means of laser systems, such as those used even at present in earth-working.

ADVANTAGES OF THE INVENTION

The main advantages, compared with conventional pipe laying in open pipe trenches, are:

minimum impairment of the environment
  smallest possible route width, and consequently use of least possible amount of land
  almost complete absence of ground-water lowering measures (only required locally, in the region of the excavation pits)
  low emissions (noise, exhaust gases), owing to reduced use of machinery
  no destruction of the natural soil structure (stratification)
  minimum earth-moving work (only removal of the drill-hole volume required)
  no obstacles for the fauna in the region of the route (e.g. in the form of the pipe trench and the excavated soil)
optimized working safety
  no need for working in pipe trenches
  no need for working under overhung loads (e.g. in the case of conventional lowering of the pipe run into the pipe trenches)
high acceptance amongst the affected nearby residents
  rapid laying, and consequently short interference period
  little physical impairment of the affected land
  low emissions (noise, exhaust gases)
improved efficiency
  high laying capacity with, at the same time, reduced use of machinery and personnel and fewer "incidentals" (e.g. lower usage fees for the working strip, owing to reduced route width, etc.)
  lesser investment requirement, owing to reduced machinery fleet The main advantages, compared with half-open pipe laying by means of plow (in displaceable soil), are:
  expansion of the technical application spectrum
    laying of even large (steel) pipes (>400 mm) possible
    use even in rocky ground possible The main advantages, compared with half-open pipe laying by means of trench cutting (in rock), are:
  minimum impairment of the environment
    low emissions (noise, exhaust gases), owing to reduced use of machinery
    no destruction of the natural soil structure (stratification)
    minimum earth-moving work (only removal of the drill-hole volume required)
    no obstacles for the fauna in the region of the route (e.g. in the form of the pipe trench and the excavated soil)
  optimized working safety
    no need for working in pipe trenches
    no need for working under overhung loads (e.g. in the case of conventional lowering of the pipe run into the pipe trenches)
  high acceptance amongst the affected nearby residents
    rapid laying, and consequently short interference period
    little physical impairment of the affected land
    low emissions (noise, exhaust gases)
  improved efficiency
    high laying capacity with, at the same time, reduced use of machinery and personnel and fewer "incidentals" (e.g. lower usage fees for the working strip, owing to reduced route width, etc.)
    lesser investment requirement, owing to reduced machinery fleet

DRAWINGS

The method according to the invention, and devices that can be used therewith, are represented in drawings and explained in the following, the features shown therein being exemplary in character, wherein, in the drawings:

FIGS. 1a-1f: show an exemplary application of the method according to the invention for laying a pipeline, prepared in one piece, in easy ground conditions.

FIGS. 2a-2e: show an exemplary application of the method according to the invention for laying a pipeline, assembled from single pipes during the laying process, in easy ground conditions.

FIGS. 3a-3g: show an exemplary application of the method according to the invention for laying a pipeline, assembled from single pipes during the laying process, in difficult ground conditions.

Figures 4A, 4B:
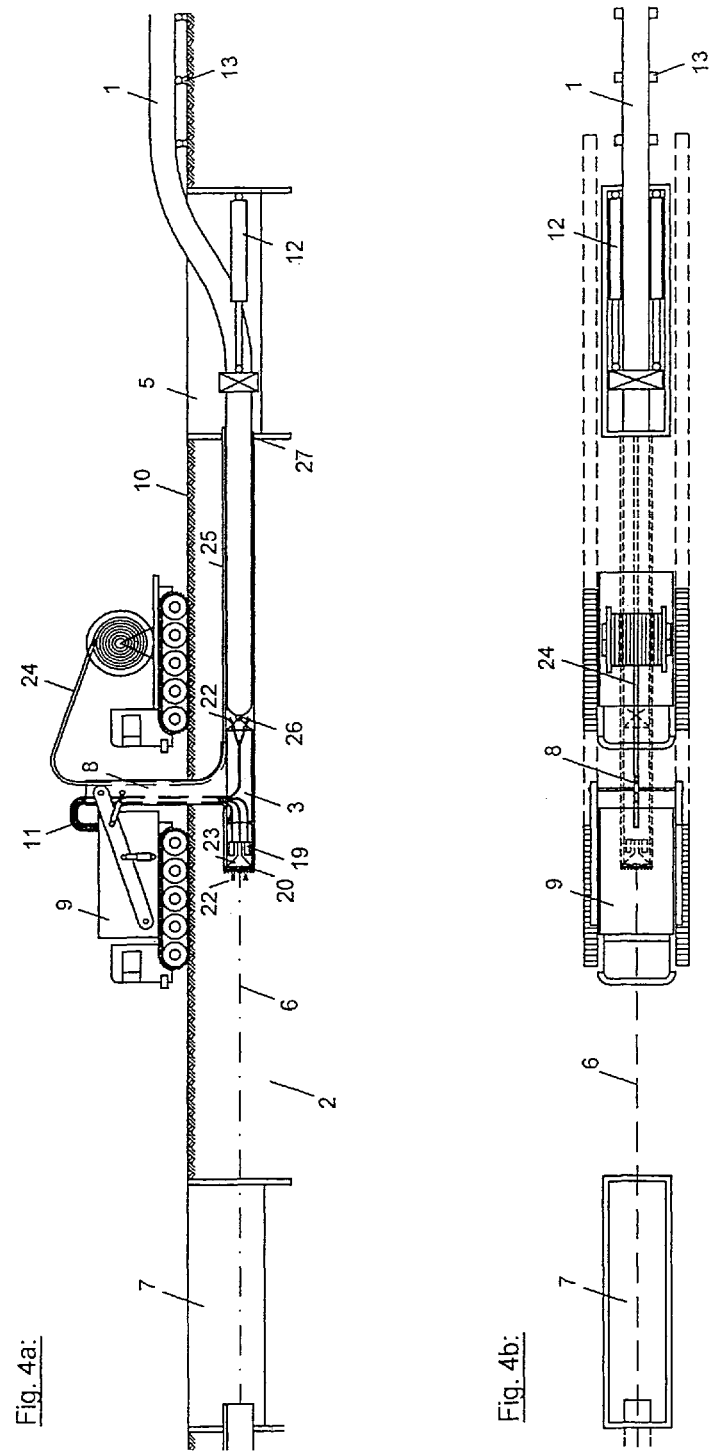

FIGS. 4a-4b: show an exemplary representation of the devices that can be used in the case of application of the method according to the invention, with simultaneous laying of a cable protecting sheath.

Figure 5A:
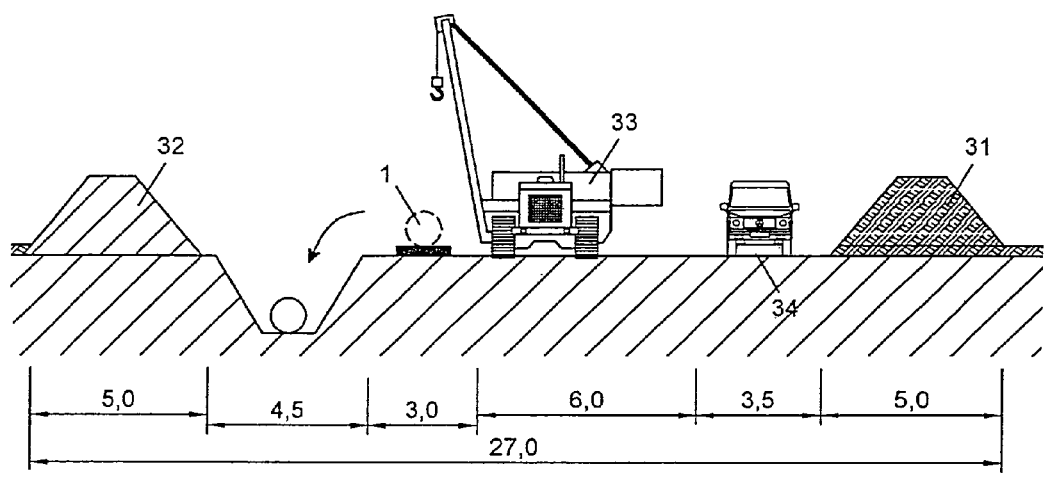
Figure 5B:
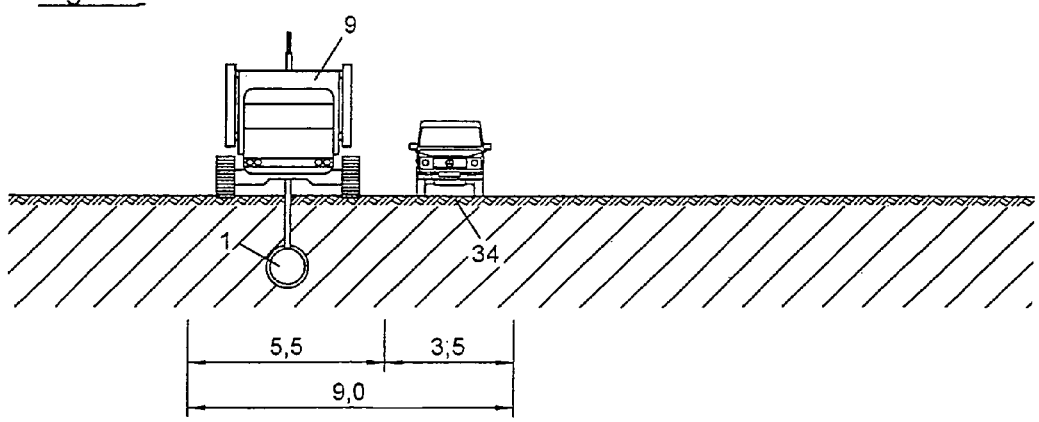

FIGS. 5a-5b: show an exemplary representation of the differing route widths in the case of application of the conventional laying method in open pipe trenches, and of the method according to the invention.

LIST OF REFERENCES

1 Pipeline
2 Ground/soil
3 Drilling head
4 Drill-hole
5 Starting pit
6 Laying line
7 Target pit
8 Vertical connecting device
9 Laying vehicle
10 Ground surface
11 Control, supply and removal lines
12 Feed device
13 Dolly
14 Single pipe
15 Covering pipe
16 Control elements on the drilling head
17 Control elements on the vertical connecting device
18 Control elements on the laying vehicle
19 Engine transmission unit
20 Cutting wheel
21 Drilling fluid
22 Nozzles
23 Breaker
24 Cable protecting sheath
25 Annular gap
26 Horizontal connecting device
27 Seal
28 Welding station
29 Winch
30 Connecting pipe
31 Topsoil
32 Excavated material from pipe trench
33 Pipe-laying machine
34 Travel track for auxiliary vehicles Exemplary Embodiments Shown in FIG. 1 is the possible application, in principle, of the method according to the invention, and of devices that can be used therewith, this variant being intended to be applied, preferably, when a high drilling speed can be achieved, owing to favorable ground conditions, and the pipes intended for the laying operation necessitate long coupling times. This configuration arises, for example, in the laying of large, thick-walled steel pipes in sandy ground.

FIG. 1a: The pipeline 1 is first prepared on the ground surface 10. This can be so effected, for example, that the single pipes 14 are connected to one another at a central welding station 28, and the thus gradually lengthened pipeline 1 is drawn by a winch 29 onto the dollies 13 set up over the laying line 6. The starting pit 5 can be created in parallel with this working step.

Figure 1B:
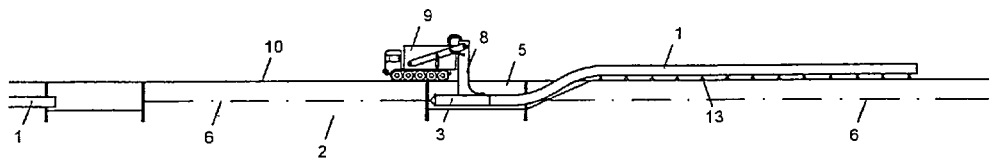

FIG. 1b: The laying vehicle 9, with the vertical connecting device 8 and the drilling head 3, can then be positioned at the starting pit 5 and connected to the pipeline 1 supplied in the elastic elbow.

Figure 1C:
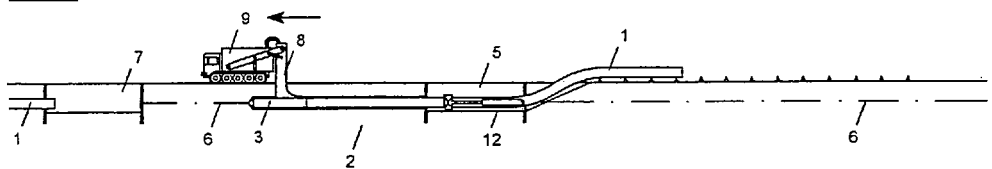

FIG. 1c: The laying vehicle 9 then moves over and along the laying line 6, in the direction of the target pit 7, the forces required for the drilling and laying operation (pressure force for the drilling head 3, friction on the pipeline 1) first being applied solely by the laying vehicle 9. Depending on the force requirement, a feed device 12 can optionally be positioned in the starting pit 5, which feed device applies additional axial forces to the pipeline 1 in the direction of laying. In the case of high accuracy requirements, the positioning of the laying vehicle 9 can be effected either via GPS or a laser measuring system. The control pulses necessary for controlling the drilling head 3 can either be produced and transmitted directly by the laying vehicle 9 (e.g. through changes of direction or a vertical connecting device 8 guided on hydraulic cylinders) or, alternatively, also through control elements (e.g. hydraulic cylinders) in the drilling head itself (analogous to the known controlling of pipe thrusting machines).

Figure 1D:
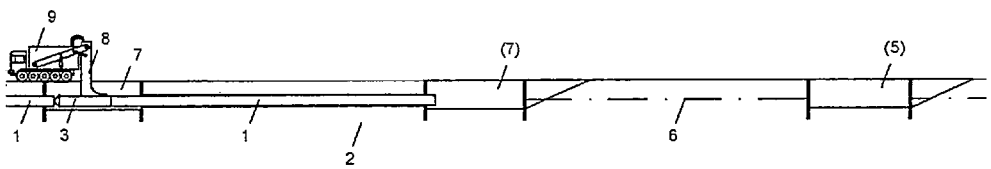

FIG. 1d: After the laying vehicle 9 has reached the target pit 7, the drilling head 3 is separated from the pipeline 1. The former starting pit 5 now becomes the new target pit 7, while, at the same time, a new starting pit 5 is created.

Figure 1E:
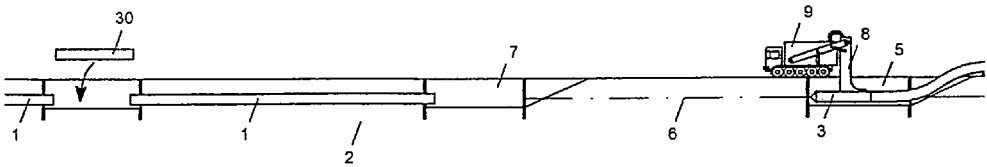

FIG. 1e: The two pipelines 1 laid in the ground 2 are now connected to one another, in the region of the former target pit 7, by means of a connecting pipe 30. The laying vehicle 9, together with the vertical connecting device 8 and the drilling head 3, is transferred to the next starting pit 5.

Figure 1F:
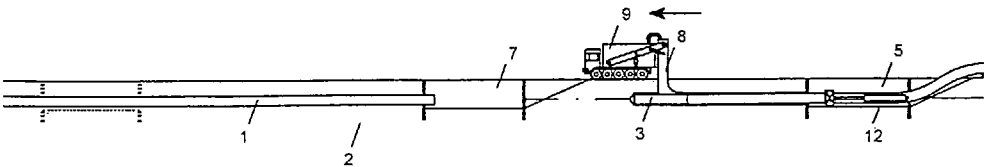

FIG. 1f: The pipe laying can now be effected, in the manner described in FIG. 1c, between the new starting pit 5 and the new target pit 7 (formerly starting pit 5). The previous target pit 7 is filled-in.

Shown in FIG. 2 is the possible application, in principle, of the method according to the invention, and of devices that can be used therewith, this variant being intended to be applied, preferably, when a high drilling speed can be achieved, owing to favorable ground conditions, and the pipes intended for the laying operation necessitate only short coupling times. This configuration arises, for example, in the laying of large, cast-iron pipes in sandy ground.

Figure 2A:
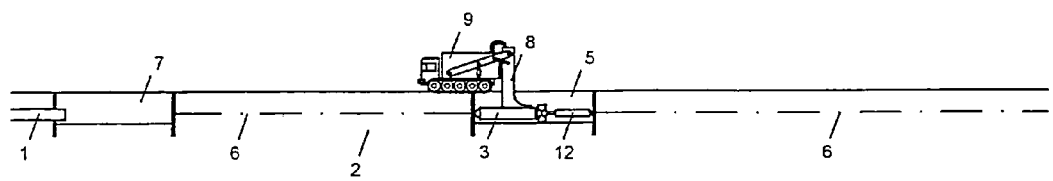

FIG. 2a: Firstly, the laying vehicle 9, with the vertical connecting device 8 and the drilling head 3, is positioned at the starting pit 5, and the feed device 12, required for laying pipes that are not resistant to tensile force, or to which only a small tensile force can be applied (e.g. cast-iron pipes with a socket joint), is installed in the starting pit 5.

Figure 2B:
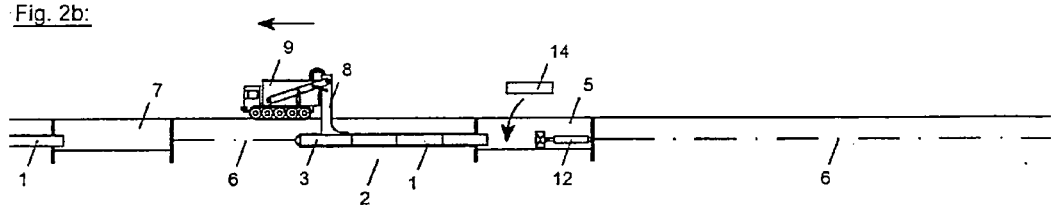

FIG. 2b: After that, the laying vehicle 9 moves over and along the laying line 6, in the direction of the target pit 7, the forces required for the drilling and laying operation (pressure force for the drilling head 3, friction on the pipeline 1) being applied jointly by the laying vehicle 9 and the feed device 12. In the case of high accuracy requirements, the positioning of the laying vehicle 9 can be effected either via GPS or a laser measuring system. The control pulses necessary for controlling the drilling head 3 can either be produced and transmitted directly by the laying vehicle (e.g. through changes of direction or a vertical connecting device 8 guided on hydraulic cylinders) or, alternatively, also through control elements (e.g. hydraulic cylinders) in the drilling head itself (analogous to the known controlling of pipe thrusting machines). Single pipes 14 are added in the starting pit 5 and pressed into the ground by the feed device 12. The drilling operation is interrupted briefly during the laying-in operation.

Figure 2C:
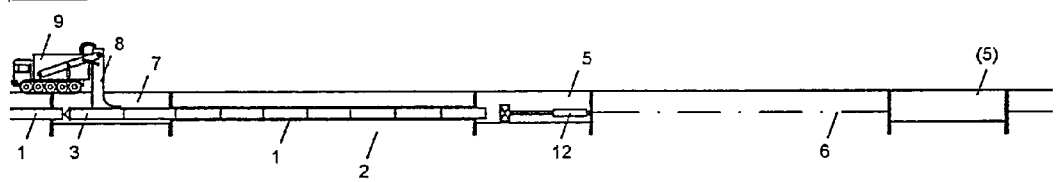

FIG. 2c: After the laying vehicle 9 has reached the target pit 7, the drilling head 3 is separated from the pipeline 1 and the laying vehicle 9, together with the vertical connecting device 8 and the drilling head 3, is transferred to the next starting pit. The former starting pit 5 now becomes the new target pit 7.

Figure 2D:
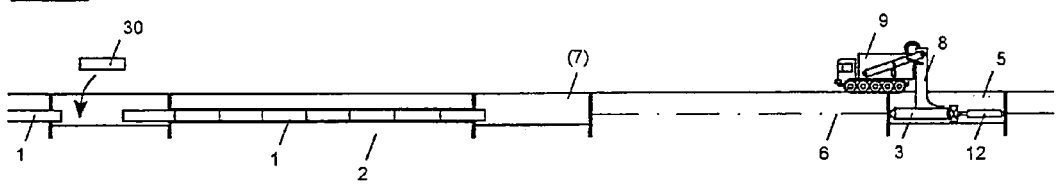

FIG. 2d: The two pipelines 1 laid in the ground 2 are now connected to one another, in the region of the former target pit 7, by means of a connecting pipe 30. The laying vehicle 9, together with the vertical connecting device 8 and the drilling head 3, is transferred to the next starting pit 5.

Figure 2E:
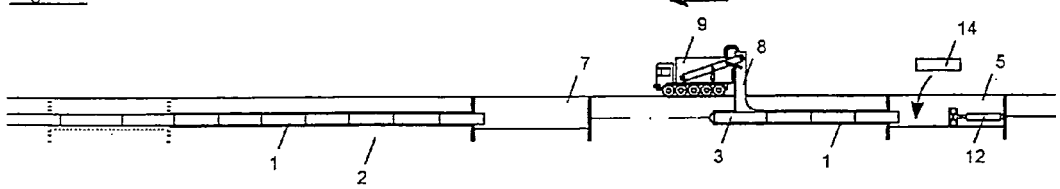

FIG. 2e: The pipe laying can now be effected, in the manner described in FIG. 2b, between the new starting pit 5 and the new target pit 7 (formerly starting pit 5). The previous target pit 7 is filled-in.

Shown in FIG. 3 is the possible application, in principle, of the method according to the invention, and of devices that can be used therewith, this variant being intended to be applied, preferably, when a high drilling speed cannot be achieved, owing to unfavorable ground conditions, and the pipes intended for the laying operation necessitate long coupling times. This configuration arises, for example, in the laying of steel pipes in rocky ground.

Figure 3A:
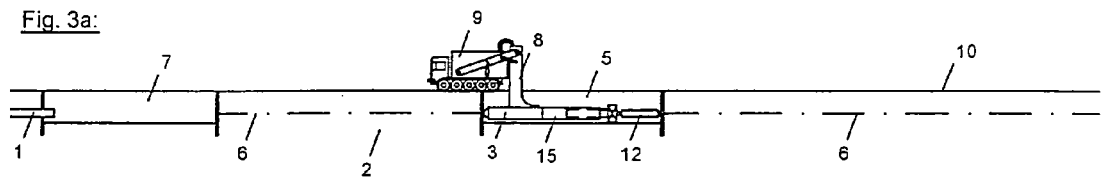

FIG. 3a: Firstly, the laying vehicle 9, with the vertical connecting device 8 and the drilling head 3 and the covering pipe 15, is positioned at the starting pit 5, and the feed device 12, required for feeding the pipeline 1, is installed in the starting pit 5.

Figure 3B:
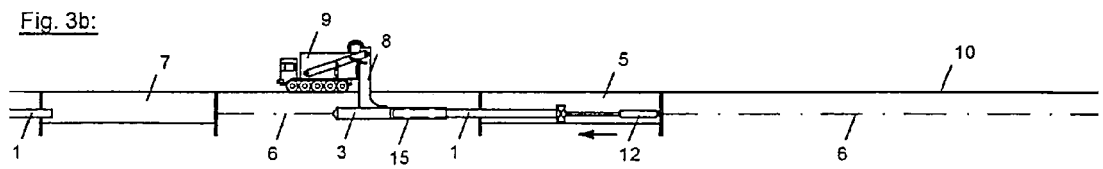

FIG. 3b: After that, the laying vehicle 9 moves over and along the laying line 6, in the direction of the target pit 7, the pressure force for the drilling head 3, required for the drilling operation, and the force required to overcome the friction on the covering pipe 15 being applied by the laying vehicle 9, and the force required to overcome the friction on the pipeline 1 being applied by the feed device 12. The covering pipe can be, for example, double the length of the single pipes 14. At the start of a working cycle, the pipeline 1 is pushed as far as possible into the covering pipe 15 by the feed device 12. In the case of high accuracy requirements, the positioning of the laying vehicle 9 can again be effected either via GPS or a laser measuring system. The control pulses necessary for controlling the drilling head 3 can either be produced and transmitted directly by the laying vehicle 9 (e.g. through changes of direction or a vertical connecting device 8 guided on hydraulic cylinders) or, alternatively, also through control elements (e.g. hydraulic cylinders) in the drilling head itself (analogous to the known controlling of pipe thrusting machines).

Figure 3C:
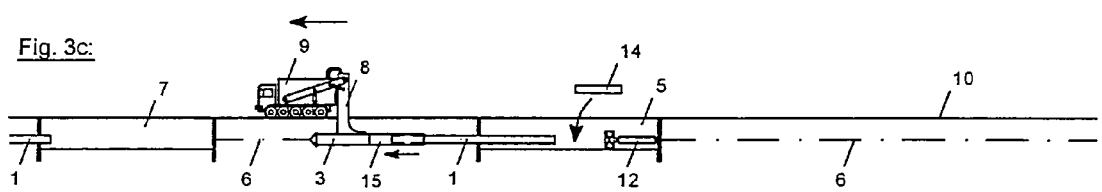

FIG. 3c: While the drilling operation is progressing continuously and the covering pipe 15 is thereby being moved slowly over the pipeline 1, in the direction of the target pit 7, a further single pipe 14 can be connected to the pipeline 1 in the starting pit 5 at the same time, without the pipeline 1 itself moving. These static conditions are necessary, for example, in the case of welding of pipes, in order to render possible the necessary high quality of the weld seams.

Figure 3D:
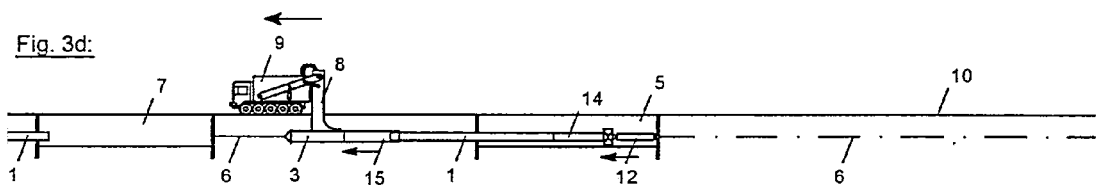

FIG. 3d: The process of connecting the single pipe 14 to the pipeline 1 is completed before the covering pipe 15 has been moved fully over the pipeline 1, such that the pipeline 1 can continue to be guided through the covering pipe 15 upon further feeding by the feed device 12. The state shown in FIG. 3b is then reattained, and the described working cycle can be repeated until the laying vehicle 9 has reached the target pit 7.

Figure 3E:
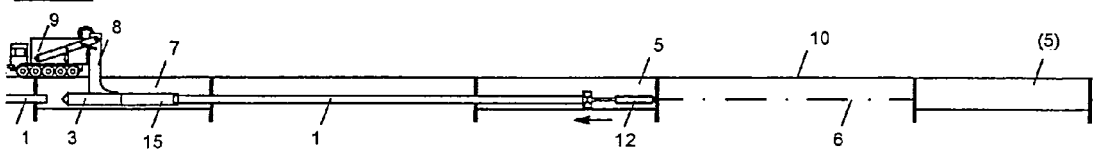

FIG. 3e: After the laying vehicle 9 has reached the target pit 7, the drilling head 3 and the covering pipe 15 are removed from the target pit 7. The former starting pit 5 now becomes the new target pit 7.

Figure 3F:
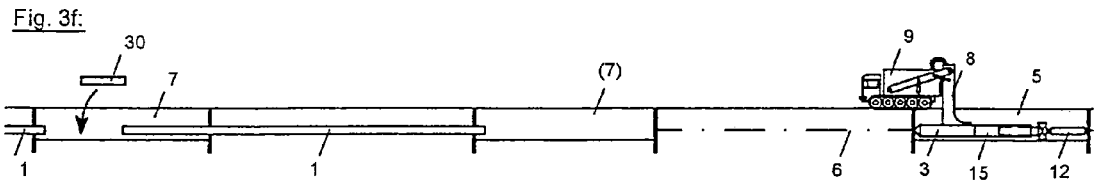

FIG. 3f: The two pipelines 1 laid in the ground 2 can now be connected to one another, in the region of the former target pit 7, by means of a connecting pipe 30. The laying vehicle 9, together with the vertical connecting device 8, the drilling head 3 and the covering pipe 15, is transferred to the next starting pit 5.

Figure 3G:
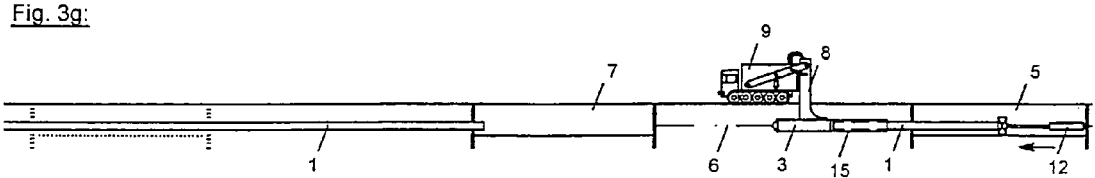

FIG. 3g: The pipe laying can now be effected, in the manner described in FIGS. 3b to 3f, between the new starting pit 5 and the new target pit 7 (formerly starting pit 5). The previous target pit 7 is filled-in.

Represented in FIG. 4 is a preferred application case wherein, in addition to the pipeline 1, a cable protecting sheath 24 is also being laid, above the pipeline 1.

FIG. 4a: In a preferred application case, the cable protecting sheath 24 is provided wound-up on a separate vehicle, and is then placed above the pipeline 1 in the ground 2, during the laying operation by the vertical connecting device 8. In a further preferred embodiment, the horizontal connecting device 26 can be of an articulated design, resistant to tensile force and pressure, whereby the controllability of the drilling head 3 is optimized and, at the same time, tensile forces can be transmitted to the pipeline 1 by the laying vehicle 9, and pressure forces can be exerted upon the drilling head 3 by the feed device 12. The driving of the cutting wheel 20 on the drilling head 3 can be effected via engine transmission units 19, such as those known from pipe thrusting, as is likewise known an optional breaker 23 for breaking-up the drillings in the drilling head 3. In a preferred application case, the soil dislodged by the cutting wheel 20 is conveyed to the surface by the vertical connecting device 8, and transported away. Via nozzles 22 in the drilling head 3, the annular gap 25, between the wall of the drill-hole 4 and the pipeline 1, that is produced during the drilling and laying operation can be filled with friction-reducing drilling fluid 21, in order to minimize the laying forces and to increase the protection of the pipeline against mechanical damage.

FIG. 4b: In a preferred application case, the track width of the laying vehicle 9 is so designed that the laying vehicle 9 can travel over the relatively narrow starting pit 5, or target pit 7. Only the narrow slit produced by the vertical connecting device 8 is visible on the surface for a short period.

FIG. 5 shows exemplarily, for a large steel pipe, the differing route requirements in the case of use of the conventional technique of laying in open pipe trenches and in the case of use of the method according to the invention.

FIG. 5a: In the case of conventional pipe laying, the topsoil 31 must first be pushed away and stored separately. The pipe trench is then excavated, and the excavated material 32 likewise stored to the side. After that, the pipeline 1 is prepared and then lowered into the trench by pipe-laying machines 33. A travel track for auxiliary vehicles 34 must be provided next to the pipe-laying machines. In the case of a steel pipe of 1200 mm in diameter, a total route width of approximately 27 m is to be assumed.

FIG. 5b: In the case of the method according to the invention, a smaller working strip is required for the laying vehicle 9 than for a pipe-laying machine 33. By contrast, the area required for the travel track for the auxiliary vehicles 34 is identical. Further areas are not required. In the case of the method according to the invention, therefore, the total width of the route is approximately 9 m, and thus only one third of the route width in the case of use of the conventional method.

The invention claimed is:

1. Drilling device for laying pipelines in the ground, comprising a drilling head for drilling a drill hole from a starting pit along a laying line to a target pit, wherein the drilling head has a cutting wheel, wherein the drilling head is connected to a narrow connecting device, connecting to a laying vehicle on the land surface, wherein the force required for the drilling and laying operation is transmitted from the laying vehicle to the drilling head, wherein the connecting device has a cutting device which loosens the soil in place in front of the connecting device in the laying direction and conveys it to the surface, and in that the drilling device is provided for laying pipelines having an outside diameter >400 mm.

2. Drilling device according to claim 1, wherein the cutting wheel rotates concentrically about the laying line during the drilling operation, as a result of which the soil is loosened by the cutting wheel.

3. Drilling device according to claim 1, wherein the connecting device has a conveyor which is set up for conveying the soil loosened by the drilling head to the surface.

4. Drilling device according to claim 1, wherein the connecting device is a vertical connecting device, which is oriented substantially vertically.

5. Drilling device according to claim 1, wherein the connecting device has a width within the range of about 100 mm to about 200 mm in the region of the ground.

6. Drilling device according to claim 1, wherein the drilling head can be controlled by at least one of control elements in or on the drilling head, control elements in or on the connecting device, or by control elements on the laying vehicle.

7. Drilling device according claim 1, wherein the cutting wheel of the drilling head is driven by at least one motor/gearing unit installed in the drilling head, and/or drilling mud discharges through nozzles at the cutting wheel and/or a breaker is installed behind the cutting wheel.

8. Drilling device according to claim 1, wherein nozzles are provided at the rear end of the drilling head, via which nozzles an annular gap between the pipeline and the drill hole wall can be filled with a friction-reducing liquid.

9. Drilling device according claim 1, wherein a horizontal connecting device is provided as a flexible connection which connects together the drilling head and the pipeline or the drilling head and a casing tube in a manner resistant to tension and compression.

10. Drilling device according to claim 1, wherein the control, supply and disposal lines required for the operation of the drilling head are run from the laying vehicle through the connecting device to the drilling head.

11. Drilling device according to claim 1 wherein the cutting device on the connecting device is a milling chain.

12. Drilling device for laying pipelines in the ground, comprising a laying vehicle and a drilling head for drilling a drill hole from a starting pit along a laying line to a target pit, wherein the drilling head has a cutting wheel, wherein the drilling head is connected to a narrow connecting device, connecting to the laying vehicle on the land surface, wherein the force required for the drilling and laying operation is transmitted from the laying vehicle to the drilling head, wherein the connecting device has a cutting device which loosens the soil in place in front of the connecting device in the laying direction and conveys it to the surface, and in that the drilling device is provided for laying pipelines having an outside diameter >400 mm.

* * * * *